United States Patent [19]
Georget et al.

[11] 3,761,878
[45] Sept. 25, 1973

[54] INSTALLATION FOR READING AT A DISTANCE INFORMATION IN LOCAL STATIONS

[75] Inventors: Philippe Georget, Montrouge; Michel Gauthier, Bagneux, both of France

[73] Assignee: Compteurs Schlumberger, Montrouge, France

[22] Filed: Feb. 11, 1972

[21] Appl. No.: 225,403

[30] Foreign Application Priority Data

Feb. 12, 1971 France .............................. 7104782

[52] U.S. Cl. .............................. 340/150, 340/168 R
[51] Int. Cl. .......................... H04q 01/32, H04q 9/14
[58] Field of Search ................ 340/147 R, 167, 152, 340/413, 168 R, 150

[56] References Cited

UNITED STATES PATENTS

| | | | |
|---|---|---|---|
| 3,516,061 | 6/1970 | Joyaux | 340/413 X |
| 3,613,092 | 10/1971 | Schumann | 340/413 |
| 3,593,293 | 7/1971 | Rorholt | 340/152 |
| 3,680,050 | 7/1972 | Griffin | 340/167 R |

*Primary Examiner*—Donald J. Yusko
*Attorney*—William R. Sherman et al.

[57] ABSTRACT

The installation is intended for reading at a distance information contained in local stations connected in cascade, and is particularly applicable to the remote reading of meters. The installation comprises a central station having a clock signal generator and a device for receiving and/or recording the information, each connected to the various local stations by a common conductor. In each local station there is a parallel to series conversion device, synchronised by the clock signals, and having its parallel inputs connected to the local source of information and its serial output connected to one of the two inputs of a logic blocking circuit; a pulse counter to which are applied the clock signals; and a bistable flip flop. This flip flop has two inputs, one of which is an unblocking input and is connected to the preceding local station and the other of which is a blocking input and is connected to the output of the pulse counter and to the following local station. The flip flop also has a trigger input to which are applied the clock signals, and an output connected to the second input of the blocking circuit, the other output being connected to the reset to zero terminal of the pulse counter. The output of the blocking circuit is connected to the receiving and/or recording device of the central station.

9 Claims, 3 Drawing Figures

INSTALLATION FOR READING AT A DISTANCE INFORMATION IN LOCAL STATIONS

Figure 1:
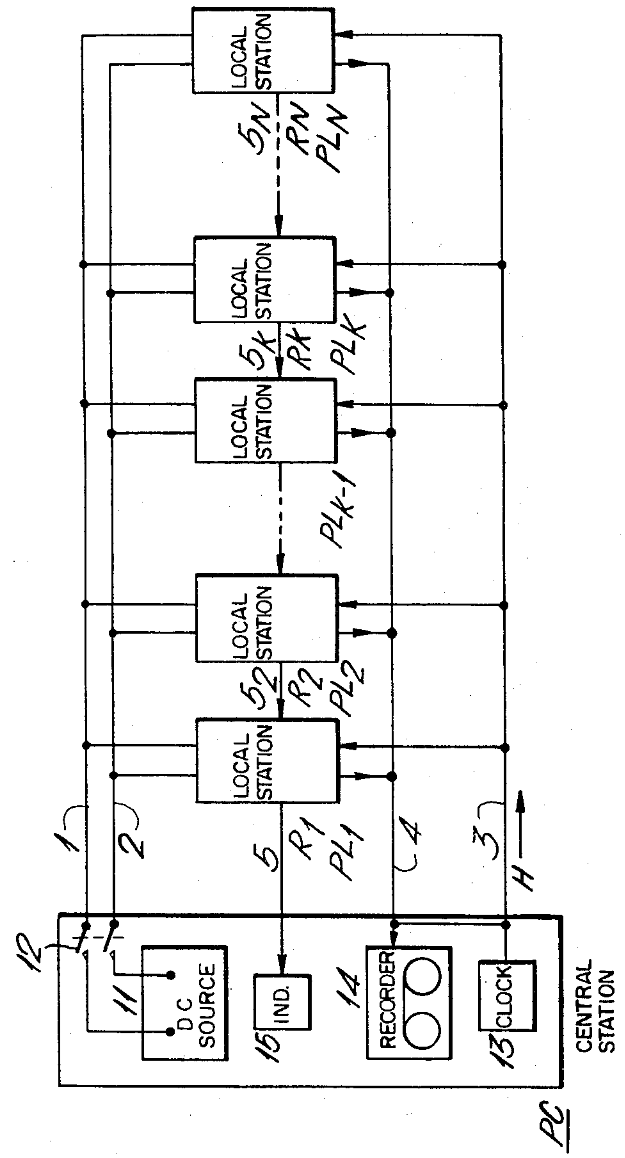

The present invention relates to an installation for reading at a distance information contained in local stations, in particular applicable to the reading or the recording at a distance of the indications of totalizing machines of meters.

Various types of sensors are already known which use mechanical, electrical, optical, etc., characteristics in order to convert the indications of a totalizing machines into electrical signals, the indications being generally binary-coded on tracks adjacent to the numerals carried by the rollers of the totalizing machines.

A sequential reading of the various electrical signals thus generated must then be effected to ensure their transmission serially with a minimum of conductors, either directly to a processing center, for example a billing center in the case of meters of subscribers in a distribution network for water, electricity, etc., or to a recorder incorporated in a carrying case which can be plugged into an installation electrically connected to the various meters of a particular building in order to perform the periodical meter reading.

The known devices for reading the binary information thus available at the output of the sensor of each local station or of each meter use movable elements, generally in the form of stepping switches which may be synchronised or not by a time-base, and which are connected in cascade with those of the preceding local stations and those of the following local stations in order to permit their interrogation to be triggered in sequence. This arrangement has the disadvantages on the one hand of necessitating a local motor to drive the stepping switch, and on the other hand of having low reliability due to the fact that the movable contacts, which are only used during the interrogation of the local station, run the risk of getting dirty and of furnishing erroneous indications, especially in the ambiant conditions where the meters can be required to operate.

An object of the invention is to palliate these disavantages by means of a remote reading installation in which the scanning of the information contained in each of the local stations is done by entirely static means.

The installation for remote reading, according to the invention, is characterised in that it comprises:

a. in a central station, at least one generator of clock signals and a device for receiving and/or recording the information, each respectively connected to the various local stations by a common conductor, b. in each local station:

a parallel-series conversion device, synchronised by the clock signals and having its inputs connected to the local source of information and its output connected to one of the two inputs of a blocking logic circuit, a pulse counter to which are applied the clock signals, a bistable flip-flop having two inputs, one being an unblocking input connected to the preceding local station, and the other being a blocking input connected to the output of the pulse counter and to the following local station, a trigger input to which are applied the clock signals, and an output connected to the second input of the blocking circuit, the other output being connected to the reset to zero terminal of the pulse counter, and the output of the blocking circuit being connected to the receiving and/or recording device of the central station.

By central station is meant both a fixed station, such as a processing center for the information or a billing center, and a mobile station, for example a portable case equipped with a magnetic recorder.

The connection between the central station and the local stations should comprise a minimal number of conductors, and the installation according to the invention permits the remote reading of the indications of the local stations with five conductors, including the two supply conductors which make its operation totally independent of the existing local sources of supply.

Figure 2:
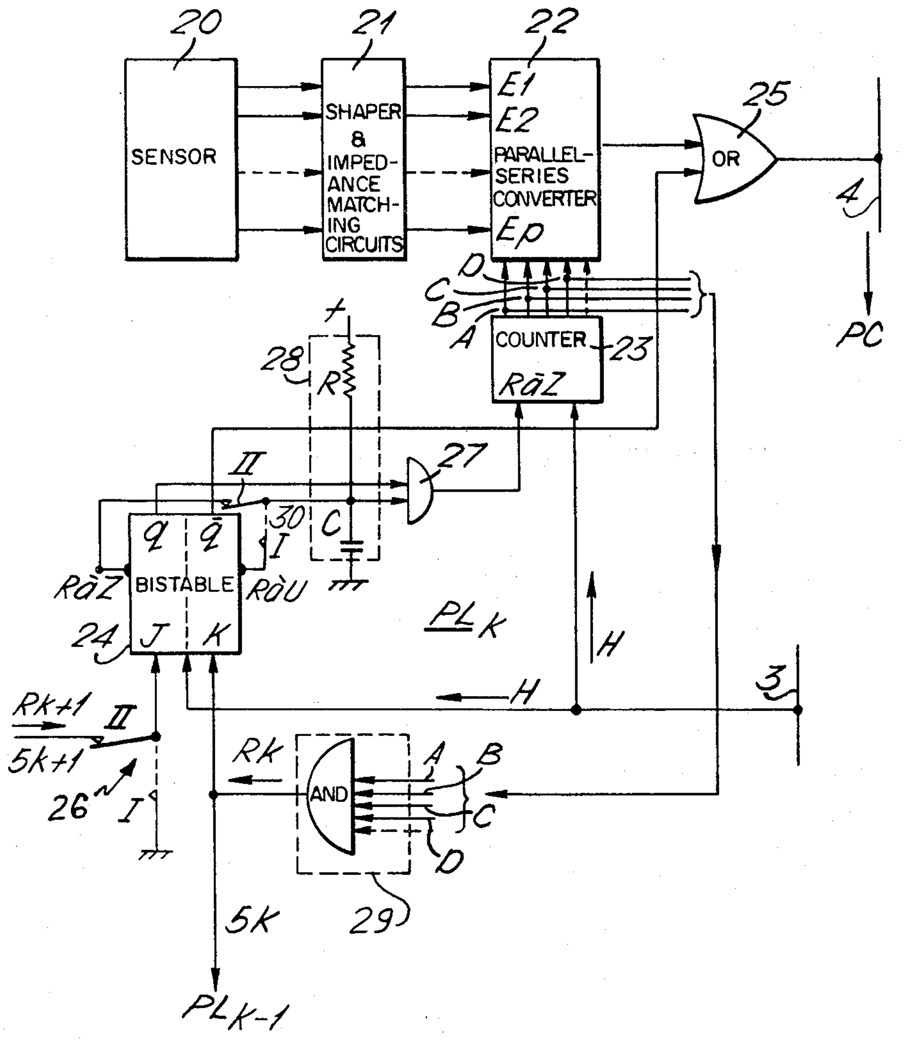
Figure 3:
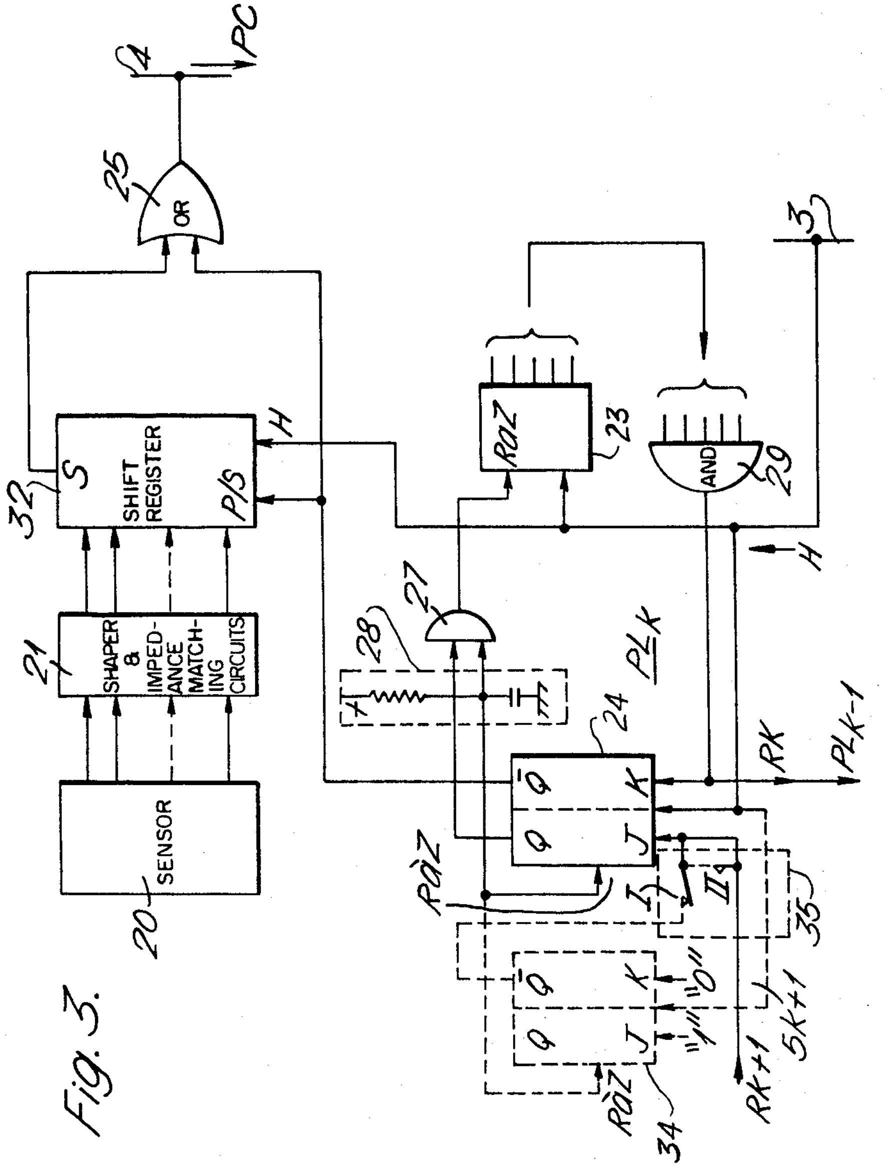

Other characteristics of the invention will be brought out in the following description given in relation with the accompanying drawings, by way of non-limiting example. In these drawings:

FIG. 1 shows a schematic block diagram of an installation in accordance with the invention, FIGS. 2 and 3 show two embodiments of the circuit of a local station connected in such an installation.

In FIG. 1, PC designates the central station and $PL_1$ to $PL_N$ the various local stations to be interrogated, connected in cascade, the station at the most remote end $PL_N$ being, by convention, the station that is interrogated the first in the sequence, and the station $PL_1$ the last. The station PC comprises a DC source of supply 11, a switch 12, a generator 13 of clock signals H, a magnetic recorder 14 and a device 15 provided with a viewing window, intended to indicate the end of the sequence of interrogation of all the local stations PL and possibly to cut off the general supply as well as the operation of the units 13, 14. The source 11 is connected, via the switch 12, to all the stations PL connected in parallel on the conductors 1, 2. The generator 13 transmits to all the stations PL the clock signals H along a conductor 3 and the reading signals coming from these stations are, in turn, transmitted to the input of the recorder 14 by a common conductor 4. The clock signals are also advantageously recorded on a clock track of the recorder. Each local station $PL_N$– is connected to the preceding station $PL_{N-1}$,–$PL_K$,–$PL_2$, $PL_1$ by conductors $5_N$,–$5_K$,–$5_2$ and the last station $PL_1$ to the central station by a conductor 5, on which conductors are applied the functional signals $R_N$,–$R_K$,–$R_2$, triggering the sequential interrogation of these local stations. The signal $R_1$ coming from the station $PL_1$ furnishes to the device 15 the end of sequence signal.

FIG. 2 shows a schematic diagram of the local station $PL_K$ in accordance with a first embodiment. 20 designates the sensor at the output of which are available in parallel the p bits of binary information E to be transmitted; this information can include the indication of an address. 21 is a shaping and impedance adaptation circuit. 22 is a parallel-series conversion device, constituted here by a selector having its output connected to one of the two inputs of a logic blocking circuit 25. For the logic adopted, this circuit is an OR circuit comprising as its output element a transistor mounted with its collector open. Putting all the circuits 25 in parallel on the conductor 4 imposes that in all the stations PL, with the exception of the station interrogated, this output transistor can be blocked by a logic level 1 on one of the inputs of the OR circuit 25.

A binary counter 23, whose capacity is at least equal to p, is intended to constitute the address register of the selector 22 and receives at its input the clock signals H transmitted by the conductor 3.

These clock signals are also applied to the trigger input of a bistable flip flop 24 whose effective change of state only takes place at the arrival of such a signal. This flip flop has two inputs, one of which, J, is called the unblocking input and is connected by the switch 26 and the conductor $5_{K+1}$ to the preceding local station $PL_{K+1}$, and the other, K, is called the blocking input and is connected to the output of a decoder 29 whose role will be specified later on. The outputs $q$ and $\overline{q}$ of this flip flop are respectively connected to one of the two inputs of an AND circuit 27 and to the second input of the OR circuit 25. The AND circuit 27 has its second input connected to a time delay circuit 28, comprising for example a resistance R and a capacitance C, connected between the positive voltage and ground, and its output connected to the reset to zero terminal RaZ of the counter 23. This circuit 28 has the role, when the voltage is applied to the station, of predetermining the state of the flip flop 24 and of the counter 23 by the temporary application of a logic level zero to their reset to zero terminals RaZ. A second switch 30 connects the point common to the elements R and C of the circuit 28 to the reset to zero terminal RaZ of the flip flop 24 corresponding to the J input.

Finally, the outputs A, B, C, D,– of the counter 23 are connected to the decoder 29 which can be a simple AND circuit if the number p of bits of information and the capacity of the counter 23 i.e., the number of states possible, is a power of 2 ($p$=$2^4$ for example). If the number p is not a power of 2, the outputs A,B,C,D,... of the counter are connected to the AND circuit by the intermediary of an inverter wherever it is necessary so that when the counter has received $p$-1 pulses, the inputs of the AND circuit 29 are all brought to the logic level 1. As a variant, a preselectable counter can be used, furnishing at the end of $p$-1 pulses a signal usable in the place of the signal from the decoder.

The output of the AND circuit 29 furnishes the signal $R_K$ sent to the K input of the flip flop and along the conductor $5_K$ to trigger the interrogation of the station $PL_{K-1}$.

The switches 26 and 30 are in position II in all the stations PL with the exception of the end station $PL_N$ where they are in position I, that is to say that only in this station the circuit 28 is connected to the reset to one RaU of the flip flop 24 by the switch 30 and that the J input is connected to the logic level zero by the switch 26.

Under these conditions, the operation of the installation in the course of an interrogation sequence takes place in the following manner: As the installation is not initially supplied with electricity, the voltage is applied to it at the beginning of the sequence by the closing of the switch 12 at the central station PC. This voltage application blocks all the local stations $PL_{N-1}$ to $PL_1$ by means of the flip flop 24 which is put in the state $q$=0 by the effect of the time constant of the circuit 28 connecting provisionally its reset to zero input to the logic level zero. In this state of the flip flop, the counter 23 is blocked in the state zero by its reset to zero input RaZ being brought to the logic level zero, since there is a zero at the input of the AND circuit 27.

Simultaneously, the output $\overline{q}$ = 1 of the flip flop 24 applied to the OR circuit 25 inhibits the transmission of information over the line 4. As long as on the line $5_{K+1}$ the signal $R_{K+1}$ is at zero, the circuits constituting the $PL_K$ station remain in the state which has just been described even through the clock signals H are applied to it.

On the other hand, in the end station $PL_N$, the flip flop 24 has its J input at the logic level zero and the switch 30 puts it in the state $\overline{q}$ = 0 during the application of voltage to the installation. This has the effect of unblocking the circuit 25 and of authorizing the passage of information over the conductor 4 at the arrival of the first clock signals consecutive to the application of the voltage: for the counter 23 is unblocked after the time delay introduced by the circuit 28, the two inputs of the AND circuit 27 being then at 1 and the reset to zero input RaZ at the logic level 1. The signals H applied to the counter 23 determine in the selector 22 the making of the successive connections, at the rhythm of these signals, between the different outputs of the adaptor 21 and the output of the device through the circuit 25.

During the transmission of the $p^{th}$ bit of information, in other words after the reception of $p$-1 clock signals H, the contents of the counter 23 reach the value $p$-1 which, detected by the decoder 29, then furnishes a signal $R_N$ of logic level 1 indicating that the interrogation of the station $PL_N$ is going to terminate. This signal $R_N$, applied on the one hand to the K input of the flip flop 24 puts this flip flop in the state $\overline{q}$ = 1 at the reception of the first consecutive clock signal, which reblocks the entire station $PL_N$, and in particular the counter 23 and the circuit 25; this signal $R_N$, applied on the other hand to the J input of the flip flop of the following local station $PL_{N-1}$, is going to trigger the interrogation of this station by causing the change of state of the flip flop to the state $q$ = 1 at the first consecutive clock signal.

An analogous process to the one that has just been described is going to take place in this station, and the interrogation sequence is going to repeat itself from local station to local station up to the last station $PL_1$ which pro-duces the signal $R_1$ at the end of the interrogation. This signal is directed to the device 15 of the central station PC and causes the indication of the end of the interrogation sequence and the cutting off of the voltage from the whole installation.

The bits of information from the various local stations are transmitted along the conductor 4, possibly with their address, and are thus available in serial form in the recorder 14 for their subsequent exploitation.

FIG. 3 shows the schematic diagram of a local station $PL_K$ modified according to a second embodiment. The parallel-series converter is in this case made in the form of a shift register 32 into which the bits of information E coming from the adaptor 21 are transferred in parallel as long as $\overline{q}$ = 1 at the output of the flip flop 24. The clock signals H are applied both to the shift input of the register 32 and to the input of the counter 23. The serial output of the register 32 is connected to the logic circuit 25.

The operation of this device is analogous to that which has just been described. In the case of a local station $PL_K$ other than the end station $PL_N$, the signal $R_{K+1}$ causes, via the intermediary of the flip flop 24 put in the state $\overline{q}$ = 0, on the one hand the end of the transfer of information E into the register 32 and on the other hand the unblocking of the circuit 25. The consecutive clock signals produce by successive shifts in the register 32 the serial transfer of the bits of information E and their transmission through the circuit 25 over the conductor 4. At the end of $p$-1 signals H totalized in the counter 23, the $p^{th}$ bit of information is in the course of transmission and the decoder 29 reblocks the station as before whereas the signal $R_K$ is going to trigger the interrogation of the following station $PL_{K-1}$.

In the case of the end station $PL_N$, the circuit is modified by the addition of a supplementary flip flop 34 of the same type as 24, shown in broken lines, having its reset to zero terminal RaZ connected to the circuit 28 in parallel with that of the flip flop 24, and its $\overline{q}$ output connected to the J input of this flip flop. When the voltage is applied to the installation, the flip flop 34 is thus prepositioned by the circuit 28 in the state $q = 0\ \overline{q} = 1$, so that, at the arrival of the consecutive clock signal, the J input of the flip flop 24 receives a logic signal 1 which plays the role of the fictitious signal $R_{N+1}$. After this first clock pulse, the flip flop 34 changes state and applies definitively a logic signal zero to the J input of the flip flop 24.

Instead of modifying the circuit of the station $PL_N$, one can also provide identical stations all comprising a flip flop 34, but this flip flop being put out of circuit in the stations $PL_{N-1}$ to P1 by means of a switch 35 inserted between the J input of the flip flop 24 on the one hand and the $\overline{q}$ output of the flip flop 34 and the conductor 5 on the other hand.

Although in the examples described, the circuit of the end station $PL_N$ has been modified with respect to the circuit of the other stations in order to start the interrogation sequence, one can use a station identical to the others if one is prepared to have a supplementary conductor for this purpose furnishing to the station $PL_N$ a signal coming from the central station and playing the role for this station of a fictitious unblocking signal $R_{N+1}$.

Although the invention has been described in relation with two embodiments given by way of example, it is understood that it is not limited thereby and that modifications can be made without departing from its scope. In particular, in the case in which the number of local stations is too great for all of them to be supplied from the central station by conductors of admissable cross section, the voltage can be applied to each local station $PL_K$ by means of a switch closed by the signal $R_{K+1}$ during the interrogation of this station, and then opened by the signal RK.

It is also advantageous to provide a counter for counting the clock signals in the central station, the comparison between the clock signals thus totalised and the signals of the information received permitting for example the station being interrogated to be determined or a station that is out of order to be identified, etc.

It is also understood that the invention is not limited to the type of logic adopted in this description and that it is applicable to other types of logic.

We claim:

1. In a system having a central station and a local station in a chain of local stations, an apparatus for sequentially recording at the central station serial data signals converted from parallel data signals representative of numerical quantities at the local station, the system comprising:

a parallel to series converter connected to each local source of parallel data signals;

transmission line means for conducting the serial data signals to the central station;

a gate coupling said parallel to series converter to said transmission line means, said gate having a first input terminal connected to the output of said converter, and a second input terminal for inhibiting the flow of the serial data signals through said gate;

means generating clock timing signals for synchronizing the operation of the system;

means for generating a start signal at the central station for initiating the operation of the first local station in the chain of local stations;

counter means connected to said source of clock timing signals for generating a counter output signal upon reaching a predetermined count, said predetermined count representing a numerical value at least equal to the maximum numerical quantity represented by the data source signal, said counter output signal from each local station constituting the start signal for the next local station in the chain after the first; and bistable switch means for providing an enabling signal to said gate and for starting said counter upon switching to a first state in response to a start signal.

2. A system according to claim 1 wherein said means for gneerating a start signal further includes a delay circuit for generating a start signal upon application of power to the local stations.

3. A system according to claim 2 wherein the start signal generated upon application of power to the local station resets said counters in each of said local stations to zero, and wherein a delay circuit responsive to said start signal generates a delayed signal for enabling said coupling gate and for initiating the counting of said counter in the first local station of a chain of local stations.

4. An apparatus in accordance with claim 1 whrein said counter output signal from said counter means of the last local station in a chain of local stations deenergizes the power source at the central station.

5. An apparatus according to claim 1 wherein said parallel to series converter comprises a shift register for registering the instantaneous values of the parallel data signals at the instant of time when said bistable switch means switches to its first state, said shift register transfering the data signals to said coupling gate in serial formation and in synchronism with the signals from said source of clock timing signals.

6. An apparatus in accordance with claim 1 wherein said counter means in each local station is preset to a predetermined count that is related to the number of bits of information to be transmitted by each local station, respectively, said preset counter means generating the start signal for each local station after the first.

7. An apparatus in accordance with claim 1 wherein said parallel to series converter includes logic means for generating serial data signals representative of the local station address said address signals being inserted in sequence with the serial data signals.

8. An apparatus in accordance with claim 1 wherein the central station further comprises:

first counter means connected to said transmission line means for counting and totalizing the serial data signals received from all local stations, second counter means being connected to said means for generating clock timing signals for totalizing said clock timing signals; and means for comparing the count of said first and said second counter means.

9. An apparatus in accordance with claim 1 wherein said parallel to series converter comprises a shift register whose input is connected to the source of data signals and whose serial output signals are connected to said coupling gate.

* * * * *